United States Patent

[11] 3,622,141

[72] Inventor Ugo Brusa
 via Borgnia 9, Domodossola, Italy
[21] Appl. No. 768,099
[22] Filed Oct. 16, 1968
[45] Patented Nov. 23, 1971
[32] Priority Nov. 3, 1967
[33] Italy
[31] 53593 A/67

[54] CONTINUOUS METAL MELTING METHOD AND FURNACE THEREFOR
3 Claims, 3 Drawing Figs.

[52] U.S. Cl. ..................................... 266/33 S, 13/9
[51] Int. Cl. ........................................ C21b 11/10
[50] Field of Search ........................................... 13/9, 14; 266/33 S, 33; 264/10

[56] References Cited
UNITED STATES PATENTS
| | | | |
|---|---|---|---|
| 1,747,756 | 2/1930 | Curtis | 13/9 |
| 1,934,634 | 11/1933 | Wiles | 13/9 |
| 1,946,252 | 2/1934 | Wiles | 13/9 X |
| 2,106,022 | 1/1938 | Seil | 13/14 X |
| 2,624,565 | 1/1953 | Kompart | 266/33 |

Primary Examiner—Donald R. Schran
Attorney—Clario Ceccon

ABSTRACT: The arc melting process uses no electrode for the melting operation and continuously melts bulks of scrap metal which have been previously preheated, compressed and fed into a furnace by opposing ends simultaneously.

INVENTOR.
UGO BRUSA

CONTINUOUS METAL MELTING METHOD AND FURNACE THEREFOR

This invention relates to a metallurgical method for steel melting and to an electrical furnace which utilizes said method.

According to known metallurgical techniques, the steel is produced in electric arc furnaces wherein unheated scrap iron is intermittently and subsequently heated up to its melting temperature by an electric arc which is struck and maintained between special electrodes made of carbonaceous material.

This method, widely employed, has the disadvantage of being considerably expensive due to the substantial use of electric current for melting the scrap iron, the considerable thermic losses through the large apertures where the furnace is open to the atmosphere and, finally the consumption and wear of electrodes, all of which factors affect considerably the production cost.

Furthermore, the known furnaces are usually of complex and expensive construction construction mainly because they require tilting means.

The consumption of electrical energy may be reduced by the provision of a nonelectric preheating of the scrap, such as for instance by using fuel oil of gas burners but, heretofore, no practical remarkable result has been obtained in this way due to the fact that, in order to obtain tangible savings, said preheating must reach at least several hundred degrees Centigrade. Serious problems arise in the handling of the scrap, with ensuing thermic losses during the operation of charging the scrap to the electric furnace.

The present invention obviates the above disadvantages by using a melting method for scrap steel which permits the elimination of the carbonaceous electrodes, the continuous charging of the scrap to the electric furnace after a preheating thereof with burners to more than 1,000° C., and the drawing off continuously of the molten metal without moving the furnace.

Briefly stated, the method according to the invention comprises the compression of the scrap steel to form at least two packs having an elongated shape and a substantially constant cross section, the feeding of said two packs toward one another with a continuous movement, the preheating thereof with gas or oil burners to about 1,000°–1,200° C., the striking and maintaining of an electric arc between the facing extremities of said packs to obtain their fusion and the collection and conveyance by gravity into a special container of the molten metal so obtained.

The invention is also concerned with an electric arc furnace without electrodes, suitable to carry out the method briefly described above.

In a first embodiment of the invention the furnace comprises an elongate chamber, having a substantially circular cross section, hermetically sealed and thermally insulated, The chamber has at its two extremities two cylindrical throats extending within the chamber to form a pair of saddles or semicylindrical guides intended for the guided compression of the scrap, and two reciprocating compressing pistons movable within the throats for the compaction of the scrap. The central section of the chamber is provided at its bottom with a collector channel for the molten metal and, at its upper part, with a carbon electrode which may be displaced vertically.

In a second embodiment, the chamber is provided with three cylindrical throats, similar to those described above. At the ends of each throat there occurs the compression of the scrap, the introduction thereof into the furnace, the feeding of the compressed scrap packs being effected independently for each of the three throats of the same chamber end.

For a better understanding of the invention reference is made to the accompanying drawings in which.

Figure 1:
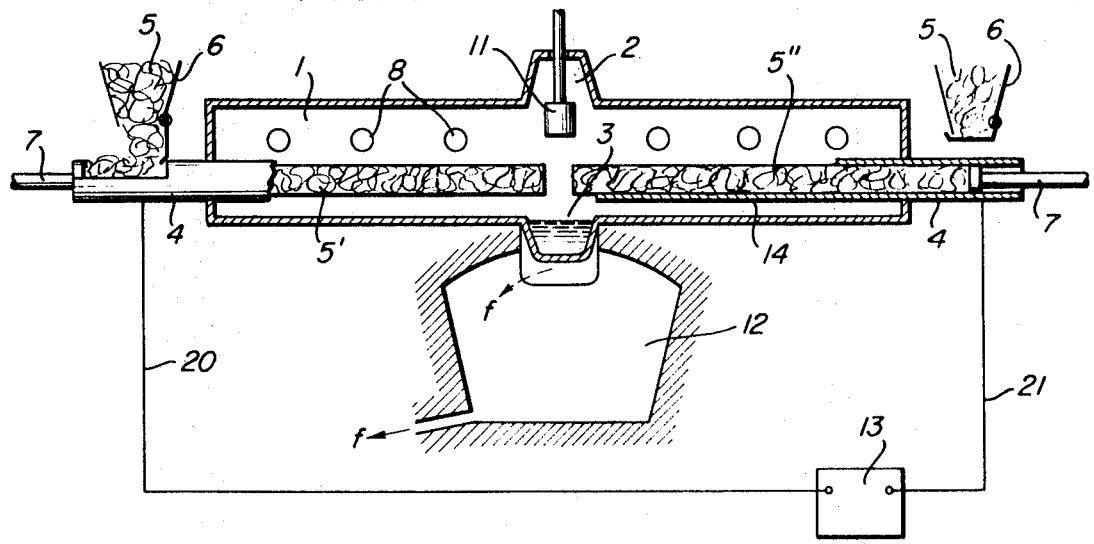
FIG. 1 is a schematic elevation view with partial section of an electrical furnace using a single-phase electrical feeding.

Referring to FIG. 1, the electric furnace according to the invention is substantially formed by an elongated chamber 1 having a substantially circular cross section, which is stationary, hermetically sealed and thermally insulated; chamber 1 has at its ends two cylindrical steel throats or tubes 4, which extend outwardly from the chamber for a considerable length and extend inwardly within the chamber as saddles or semicylindrical guides 14. Said cylindrical throats 4 within which may slide a piston 7, are open on the upper part at their ends and are in communication with hoppers 6 which are provided with a mobile bottom 31 to discharge the scrap metal 5.

The central section of chamber 1 presents an upper bell-shaped part 2 wherein an electrode 11 may move vertically, and a bottom transversal sloping recess or channel 3 to collect and convey the molten metal. A number of burners 8 is represented along chamber 1.

An electrical source 13 is electrically connected by means of conductors 20 and 21 to cylindrical throats 4. Furthermore, a vat or collecting chamber 12 for the molten metal and a pair of cylindrical, compressed scrap metal packs 5' and 5" complete the device illustrated.

The operation of the described electric arc furnace is as follows:

Scrap material 5 is charged in bulk to a hopper 6 and, when the bottom door 31 of the hopper is opened, the scrap falls unto the cylindrical throat end 4 which is provided with an upper semicylindrical overturning cover 32. Then, the cover is closed and piston 7, hydraulically actuated, compresses the scrap within tube 4 against a retaining means such as a metal diaphragm 33. When piston 7 has achieved the compression of the scrap, the diaphragm is removed and the piston pushes toward the center of the furnace the compressed scrap 5' upon guides 14 and then moves back; the upper cover 32 of the throat is again opened and another amount of scrap is allowed to fall in bulk within tube 4.

The same occurs in the cylindrical throat located at the opposite extremity of chamber 1. Two cylindrical packs 5' and 5" of compressed scrap are thus obtained which are pushed towards the central section of chamber 1, sliding on saddle guides 14 formed by the extension of the cylindrical throats 4. While traveling towards the central section of chamber 1, the compressed bulks 5' and 5" are heated by the burners 8. When the ends of the two packs 5' and 5" are almost in contact with one another, the electric arc furnace is ready to initiate the melting operation. The electrode 11 is lowered and voltage is applied to the two scrap packs by means of electrical connections 20, 21 and tubes 4. When the arc is struck, the electrode 11 is again raised and the arc is maintained, by the surrounding ionized air, between the ends of the packs 5' and 5". Due to the heat of the arc, the scrap which was already heated to more than 1,000° C., is further heated and melts, and drops in channel 3 whence it passes by gravity into the collecting vat 12 where it may be drawn off by known means. The molten metal path is shown by the arrows $f, f'$. The cylindrical packs 5' and 5" are continuously consumed but the distance between their opposite facing ends remains substantially constant due to compressing of material at the inlet ends and by the continuous feeding of new scrap packs.

In this way, a practically continuous charging of scrap is obtained and molten metal may be drawn off from the collecting vat 12. Input tube 4 may extend for a considerable length within chamber 1 in order to reduce the surface oxidation of the material protecting it against a too direct action of burners 8.

Current is carried by shells 4, 14 against which the material is pressed and this presents a further advantage in that it avoids local welding effects between the scrap and slide guides 14. The carbon electrode 11 is used only sparingly for striking the arc, and hence its consumption is reduced considerably.

In a modification of the furnace described hereabove, electrode 11 is not necessary, and arc striking between the ends of the two scrap packs may be obtained for instance by introducing ionized air in that central region. The furnace described may operate either with direct current or alternate single-phase current.

Figure 2:
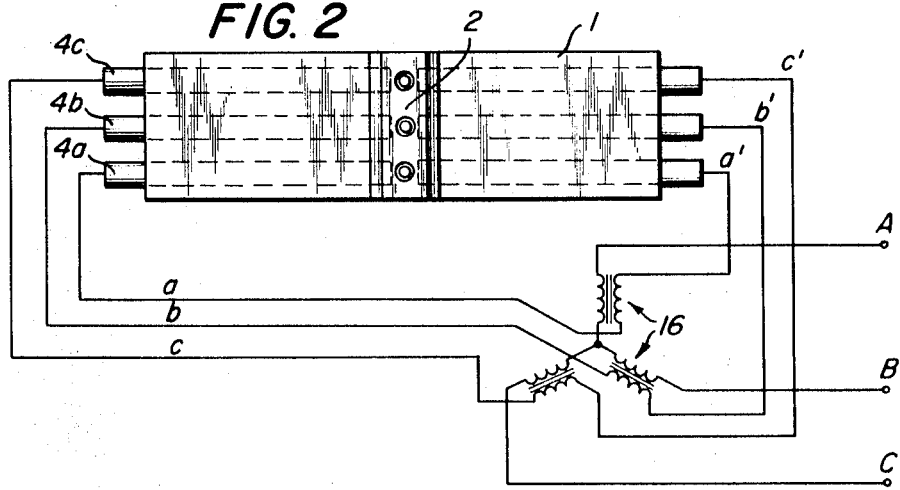
FIG. 2 is a schematic plan view of a three-phase furnace and the feeding electrical circuit.

For considerably large installations, a three-phase electrical feeding, as shown in FIG. 2, may advantageously be used. In that case, the furnace is provided, within a single chamber 1, with three distinct pairs of compression and guide elements for the scrap, shown respectively at 4a, 4b and 4c. Each pair is fed through electrical leads aa', bb', cc', by three separate secondary windings of a transformer 16 having a three-phase primary winding ABC.

Figure 3:
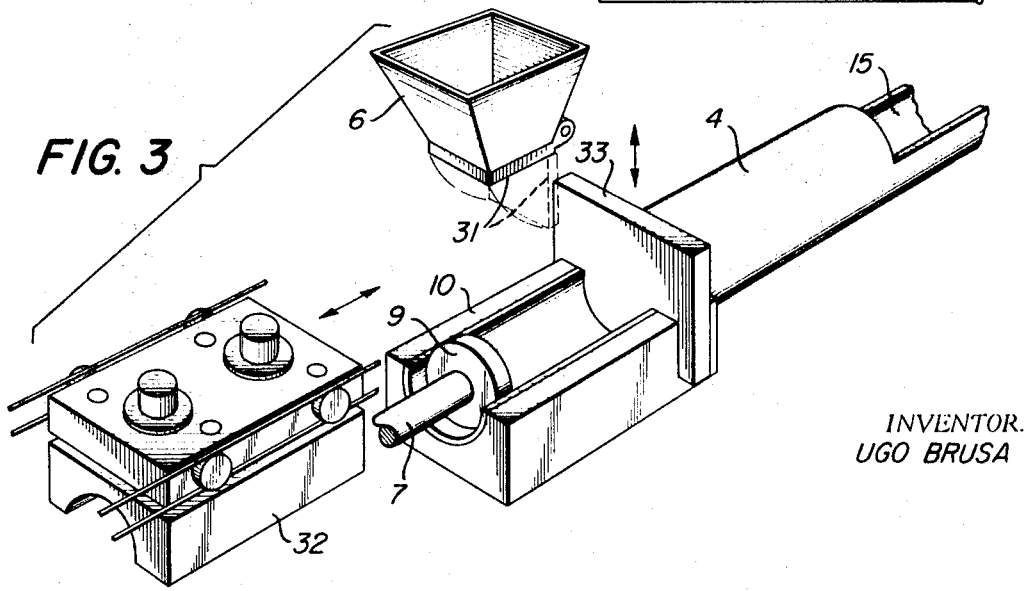
FIG. 3 is an exploded perspective view of a detail of FIGS. 1 and 2.

In FIG. 3 there is shown in greater detail one of cylindrical throats or tubes 4 to compress and advance the scrap. A piston 7 is shown which is slidably fitted within the tube and comprises a compressing disk or head 9. Numeral 10 indicates the mobile cover of the extremity wherein the scrap is charged in bulk and 15 is the saddle guide which extends within chamber 1. Tube 4 has been represented as having a circular cross section but its cross section may be trapezoidal or rectangular or the like depending on the convenience of construction.

In another modification, channels 14 have their axes inclined downwardly to facilitate the gravity feeding of scrap along them.

The invention has been described with reference to several particular embodiments, all of which show the following inventive features:

The scrap is introduced into the furnace after a preheating at a temperature of about 1,000° C.;

The scrap is compressed in alignment with the furnace throat and then pushed into the feed channel, provided with heating means;

The scrap is fed into the furnace in a substantially continuous manner; and

The scrap is melted by means of an electric arch which is obtained between two scrap bulks, without the need of an electrode.

What I claim is:

1. Electric arc furnace for melting of scrap metal which comprises an elongated chamber having substantially a cylindrical shape, hermetically sealed and electrically insulated, having at each of its two ends at least one cylindrical throat with a semicylindrical guide portion made of steel and extending within said chamber as a saddle, a diaphragm positioned transversely in said throat, a compressing reciprocating piston mounted within each of said throats for compacting the scrap against said diaphragm and feeding said scrap towards said chamber, preheating means for said scrap metal internally of said chamber and externally of said throat, said preheating means being located axially along said chamber, means for initiating an arc and a collection vessel for the molten metal.

2. Electric furnace, according to claim 1, wherein said cylindrical throats extend considerably within said chamber to protect the compressed scrap from the direct action of said preheating means.

3. Electric furnace, according to claim 1, wherein the outer ends of said cylindrical throats are provided with overturnable lids which when in open position allow the charging of said scrap metal into the throats and, when in closed position allow the compression of said scrap by said reciprocating pistons.

* * * * *